(12) United States Patent
Maher et al.

(10) Patent No.: US 7,440,866 B2
(45) Date of Patent: Oct. 21, 2008

(54) SYSTEM AND METHOD FOR VALIDATING AN INPUT/OUTPUT VOLTAGE OF A TARGET SYSTEM

(75) Inventors: John A. Maher, San Jose, CA (US); Mitchell Grant Poplack, San Jose, CA (US)

(73) Assignee: Quickturn Design Systems Inc., San Jose, CA (US)

( * ) Notice: Subject to any disclaimer, the term of this patent is extended or adjusted under 35 U.S.C. 154(b) by 596 days.

(21) Appl. No.: 11/140,722

(22) Filed: May 31, 2005

(65) Prior Publication Data

US 2005/0267728 A1 Dec. 1, 2005

Related U.S. Application Data

(60) Provisional application No. 60/576,611, filed on Jun. 1, 2004, provisional application No. 60/576,691, filed on Jun. 1, 2004.

(51) Int. Cl.
*G06F 19/00* (2006.01)
*G01R 27/28* (2006.01)
*G01R 31/00* (2006.01)
*G01R 31/14* (2006.01)

(52) U.S. Cl. .......................... 702/120; 714/33; 714/37; 703/25; 703/27

(58) Field of Classification Search ................ 702/57, 702/64, 117, 120; 703/25, 27; 710/12, 36, 710/48; 714/33, 37, 725; 716/4
See application file for complete search history.

(56) References Cited

U.S. PATENT DOCUMENTS

| | | | |
|---|---|---|---|
| 5,109,353 A | 4/1992 | Sample et al. | 364/578 |
| 5,126,966 A | 6/1992 | Hafeman et al. | 364/500 |
| 5,377,124 A | 12/1994 | Mohsen | 364/489 |
| 5,414,638 A | 5/1995 | Verheyen et al. | 364/489 |
| 5,475,830 A | 12/1995 | Chen et al. | 395/500 |
| 5,544,069 A | 8/1996 | Mohsen | 364/489 |
| 5,551,013 A | 8/1996 | Beausoleil et al. | 703/23 |
| 5,574,388 A | 11/1996 | Barbier et al. | 326/41 |
| 5,596,742 A | 1/1997 | Agrawal et al. | 395/500 |
| 5,649,176 A | 7/1997 | Selvidge et al. | 395/551 |
| 5,654,564 A | 8/1997 | Mohsen | 251/209 |
| 5,659,716 A | 8/1997 | Selvidge et al. | 395/500 |
| 5,754,827 A | 5/1998 | Barbier et al. | 395/500 |
| 5,761,484 A | 6/1998 | Agarwal et al. | 395/500 |
| 5,777,489 A | 7/1998 | Barbier et al. | 326/40 |

(Continued)

*Primary Examiner*—Edward Raymond
*Assistant Examiner*—Elias Desta
(74) *Attorney, Agent, or Firm*—Orrick, Herrington & Sutcliffe LLP

(57) ABSTRACT

A target interface system for interfacing selected components of a communication system and methods for manufacturing and using same. Being reconfigurable to support an extensive range of conventional input/output technologies, the target interface system downloads a selected image associated with a desired input/output technology prior to runtime. The selected image identifies an appropriate output driver supply voltage, and any auxiliary voltages are controlled as functions of the output driver supply voltage to limit voltage inconsistencies. Defaulting each voltage to its least dangerous state when unprogrammed, the target interface system subsequently monitors the voltages, disabling the input/output connections if a problem is detected. The target interface system likewise detects when a selected system component is absent, unpowered, and/or wrongly powered and provides contention detection. Thereby, the target interface system can facilitate communication among the system components while inhibiting damage to the target interface system and/or the system components.

28 Claims, 9 Drawing Sheets

U.S. PATENT DOCUMENTS

| | | | |
|---|---|---|---|
| 5,790,832 A | 8/1998 | Barbier et al. | 395/500 |
| 5,802,348 A | 9/1998 | Stewart et al. | 395/500 |
| 5,822,564 A | 10/1998 | Chilton et al. | 395/500 |
| 5,847,578 A | 12/1998 | Noakes et al. | 326/39 |
| 5,850,537 A | 12/1998 | Selvidge et al. | 395/500 |
| 5,854,752 A | 12/1998 | Agarwal | 364/489 |
| 5,884,066 A | 3/1999 | Kuijsten | 395/500 |
| 5,920,712 A | 7/1999 | Kuijsten | 395/500 |
| 5,963,736 A | 10/1999 | Sarno et al. | 395/500.48 |
| 6,020,760 A | 2/2000 | Sample et al. | 326/41 |
| 6,034,857 A | 3/2000 | Sample et al. | 361/93.2 |
| 6,035,117 A | 3/2000 | Beausoleil et al. | 703/25 |
| 6,051,030 A | 4/2000 | Beausoleil et al. | 703/20 |
| 6,058,492 A | 5/2000 | Sample et al. | 714/33 |
| 6,259,588 B1 | 7/2001 | Sample et al. | 361/93.2 |
| 6,285,211 B1 | 9/2001 | Sample et al. | 326/41 |
| 6,377,912 B1 | 4/2002 | Sample et al. | 703/28 |
| 6,499,122 B1 * | 12/2002 | Coomes | 714/724 |
| 6,618,698 B1 | 9/2003 | Beausoleil et al. | 703/23 |
| 6,681,377 B2 | 1/2004 | Beletsky | 716/6 |
| 6,694,464 B1 | 2/2004 | Quayle et al. | 714/725 |
| 6,697,957 B1 | 2/2004 | Wang et al. | 713/401 |
| 6,779,140 B2 * | 8/2004 | Krech et al. | 714/718 |
| 6,842,729 B2 | 1/2005 | Sample et al. | 703/24 |
| 6,850,880 B1 | 2/2005 | Beausoleil et al. | 703/23 |
| 6,901,359 B1 | 5/2005 | Beausoleil et al. | 703/24 |
| 2006/0044018 A1 * | 3/2006 | Chang | 326/101 |

* cited by examiner

US 7,440,866 B2

SYSTEM AND METHOD FOR VALIDATING AN INPUT/OUTPUT VOLTAGE OF A TARGET SYSTEM

CROSS-REFERENCE TO RELATED APPLICATIONS

This application claims priority to U.S. Provisional Application Ser. No. 60/576,611 and U.S. Provisional Application Ser. No. 60/576,691, each being filed on Jun. 1, 2004. Priority to these prior applications is expressly claimed, and the disclosures of respective applications are hereby incorporated by reference in their entireties.

FIELD

The present invention relates generally to hardware emulation systems for verifying electronic circuit designs and more particularly, but not exclusively, to interface systems for coupling such hardware emulation systems with other system components in emulation.

BACKGROUND

Emulation systems are used to verify electronic circuit designs prior to fabrication as chips or manufacture as electronic systems. Typical emulation systems utilize either interconnected programmable logic chips or interconnected processor chips. Examples of hardware logic emulation systems using programmable logic devices can be seen in, for example, U.S. Pat. Nos. 5,109,353, 5,036,473, 5,475,830 and 5,960,191. U.S. Pat. Nos. 5,109,353, 5,036,473, 5,475,830 and 5,960,191 are incorporated herein by reference. Examples of hardware logic emulation systems using processor chips can be seen in, for example, U.S. Pat. Nos. 5,551,013, 6,035,117 and 6,051,030. U.S. Pat. Nos. 5,551,013, 6,035,117 and 6,051,030 are incorporated herein by reference.

The design under test is usually provided in the form of a netlist description of the design. The netlist may have been derived from many sources, including from a hardware description language. A netlist description (or "netlist" as it is referred to by those of ordinary skill in the art) is a description of the circuit's components and electrical interconnections between the components. The components include all those circuit elements necessary for implementing a logic circuit, such as combinational logic (e.g., gates) and sequential logic (e.g., flip-flops and latches). In prior art emulation systems, the netlist is compiled such that it is placed in a form that can be used by the emulation system. In an FPGA-based emulator, the DUV is compiled into a form that allows the logic gates (both sequential and combinational) to be implemented in the FPGAs. In a processor-based emulation system, the DUV is compiled into a series of statements that will be executed by the processors on the processor chips. No logic is implemented into these processors.

Conventional hardware emulation systems include target interface systems for coupling with one or more user testbenches and/or target systems. A "target system" is, generally speaking, the actual operating environment that the DUV, once manufactured, will be installed. Thus, the target system for a microprocessor DUV can be a personal computer. A "testbench," in this context, is an application that may apply a set of stimuli (such as a test vector) to a model to produce a set of information used in analyzing the timing or performance of a system block. The target interface systems of these hardware emulation systems suffer from several limitations. For example, the input/output (I/O) technologies employed by such target interface systems are not suitable for supporting differential signaling technologies. Connection to a differential target system requires the use of additional technology conversion hardware, which generally must be custom made. The design under test thereby is required to expose a single logical signal as a primary I/O (as opposed to possibly two nets), requiring manual intervention into the netlist of the design.

Other disadvantages of the target interface systems of conventional hardware emulation systems include the use of fixed input/output (I/O) technologies. The target interface systems likewise provide limited I/O timing control as well as a limited number of directional signals for bidirectional signals. Further, conventional target interface systems cannot verify the validity of the I/O voltage of the target system and are unable to detect whether the target system is powered on, powered off, or unconnected.

In view of the foregoing, a need exists for an improved hardware emulation system that overcomes the aforementioned obstacles and deficiencies of currently-available hardware emulation systems.

Figure 1:
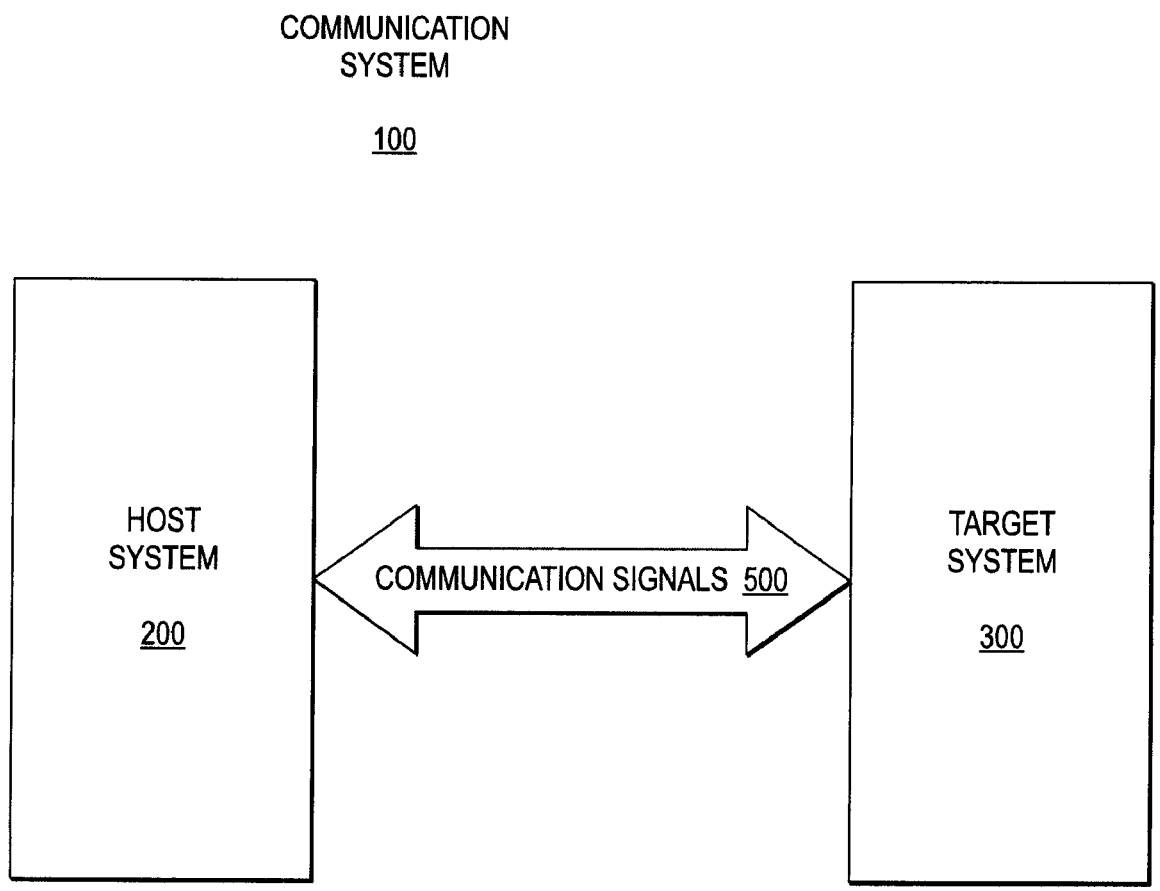
FIG. 1 is an exemplary top-level block diagram illustrating an embodiment of a communication system in which the communication system includes a host system and a target system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION OF THE DRAWINGS

Since conventional hardware emulation systems suffer from several limitations, such as the use of fixed input/output (I/O) technologies, a communication system that includes a target interface system for supporting a plurality of diverse signaling levels, signal technologies, and/or signal drive strengths can prove much more desirable and provide a basis for a wide range of system applications, such as hardware emulation systems. This result can be achieved, according to one embodiment disclosed herein, by employing a communication system 100 as shown in FIG. 1.

The communication system 100 can be provided in any suitable manner, including the manner disclosed in co-pending United States Patent Application, entitled "SYSTEM AND METHOD FOR CONFIGURING COMMUNICATION SYSTEMS," Ser. No. 10/992,165, filed on Nov. 17, 2004, which is assigned to the assignee of the present application and the disclosure of which is hereby incorporated herein by reference in its entirety. As shown in FIG. 1 herein, the exemplary communication system 100 can comprise a host system 200 and at least one target system 300. Typically being coupled via one or more communication cable assemblies 400 (shown in FIG. 2), the host system 200 and each target system 300 are configured to communicate such that communication signals 500 can be exchanged among the host system 200 and the target systems 300.

Figure 2:
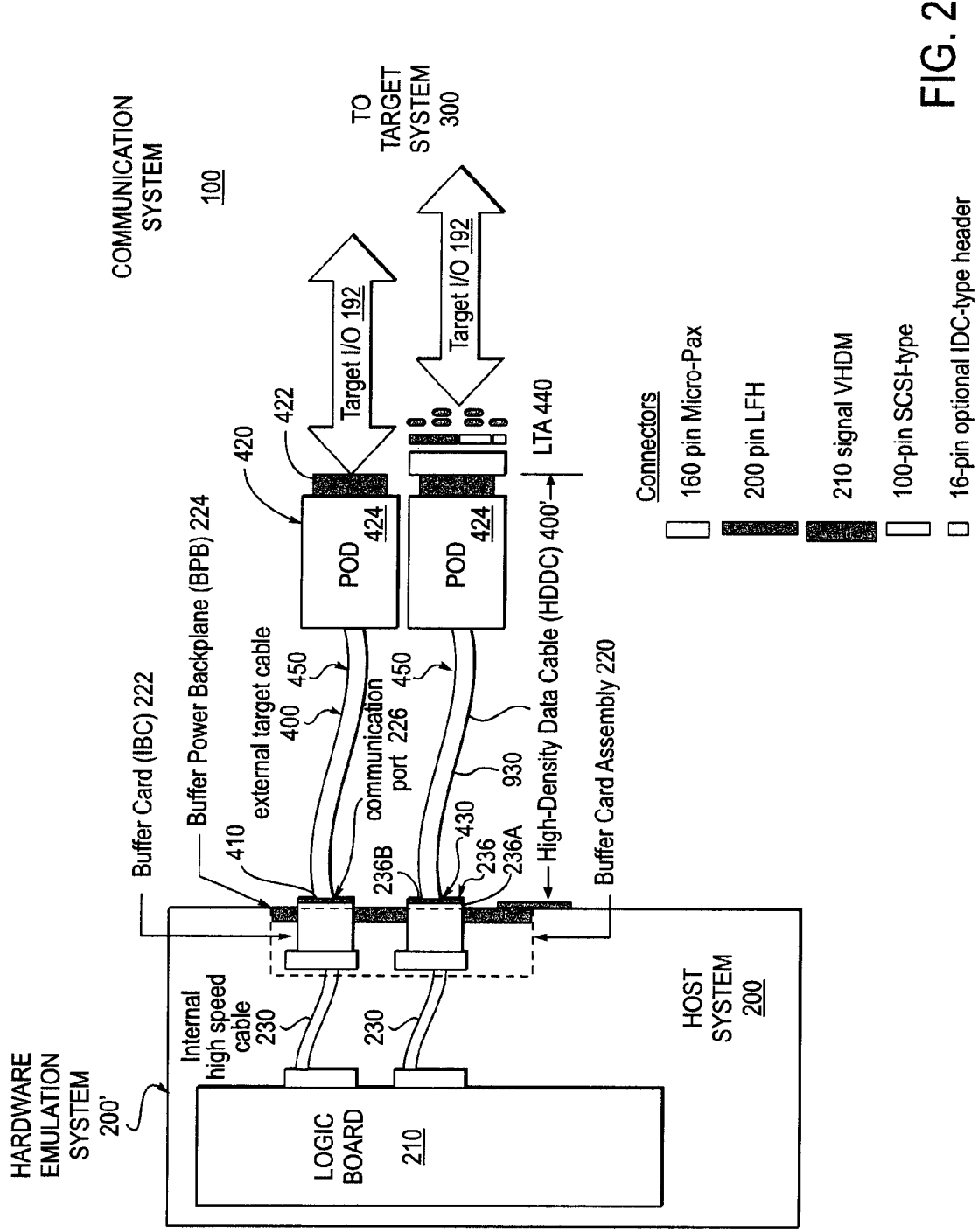
FIG. 2 is an exemplary block diagram illustrating an embodiment of the communication system of FIG. 1 in which the communication system comprises a hardware emulation system for developing one or more components of the target system.

Turning to FIG. 2, the communication system 100 is illustrated as comprising a hardware emulation system 200', such as an accelerator, a simulator, and/or an emulator, for developing the target system 300 and/or one or more components of the target system 300. Prior to manufacture of an integrated circuit, designers generally verify the functionality of their designs (referred to herein as the "design under verification"). The communication system 100 therefore preferably is provided as a hardware emulation system 200' to allow the designers to verify that a design under verification will function in the system in which the integrated circuit will eventually reside (i.e., the target system 300). Exemplary hardware emulation systems include the Palladium acceleration/emulation system and the NC-Sim simulation system each produced by Cadence Design Systems, Inc., of San Jose, Calif.

Further details and features relating to the structure and operation of the communication system 100 and/or the hardware emulation system 200' are disclosed in the following co-pending United States Patent Applications filed on the same date herewith: "SYSTEM AND METHOD FOR PROVIDING FLEXIBLE SIGNAL ROUTING AND TIMING," Ser. No. 11/140,714; "EXTENSIBLE MEMORY ARCHITECTURE AND COMMUNICATION PROTOCOL FOR SUPPORTING MULTIPLE DEVICES IN LOW-BANDWIDTH, ASYNCHRONOUS APPLICATIONS," Ser. No. 11/141,599; and "SYSTEM AND METHOD FOR RESOLVING ARTIFACTS IN DIFFERENTIAL SIGNALS," Ser. No. 11/141,141, which are assigned to the assignee of the present application and the respective disclosures of which are hereby incorporated herein by reference in their entireties.

The hardware emulation system 200' shown in FIG. 2 includes a logic board 210 and a buffer card assembly 220. The logic board 210 is a printed circuit board carrying either logic devices and interconnect devices or processor chips. Illustrated as being coupled with the logic board 210 via one or more internal high-speed communication cables 230, the buffer card assembly 220 provides an input/output (I/O) system for the hardware emulation system 200'. The buffer card assembly 220 includes at least one interface buffer card 222 for providing buffering to electrically protect the emulation modules of the logic board 210 from external effects and a buffer power backplane 224. Preferably providing power to each interface buffer card 222, the buffer power backplane 224 likewise provides information regarding the location of each interface buffer card 222 for the purposes of configuration detection and verification.

The target system 300 likewise can include other peripheral systems and subsystems of the hardware emulation system 200', as desired. Because such emulated representations allow a circuit designer flexibly to operate or develop the target system 300 coupled to the emulated representation, even before the prototype circuit design or hardware is actually manufactured, overall design time and cost is reduced significantly. As desired, other peripheral systems (not shown), such as one or more additional hardware or software development platforms, computers, and/or test equipment, also may be coupled with the host system 200 and/or the target system 300. By providing an emulation environment for the target system 300, the host system 200 can for perform functional verification for all of, or at least one component of, the target system 300 in any appropriate manner. The host system 200, for instance, can provide co-simulation and/or simulation acceleration and/or can be configured for in-circuit use. The host system 200 likewise can provide a platform for performing hardware and software co-verification for the target system 300.

For example, the target system 300 can include a logic circuit and can be assembled, along with one or more electronic components, such as integrated components and/or discrete components, on a hardware development platform (not shown) in the manner known in the art. Exemplary logic circuits can include reconfigurable logic circuits, such as one or more field-programmable gate arrays (FPGAs), and/or non-reconfigurable logic circuits, such as one or more application-specific integrated circuits (ASICs). Once assembled, the reconfigurable logic circuit can be customized to implement a user design by loading configuration data into the reconfigurable logic circuit. By programming the internal memory cells, a customized configuration is established within the reconfigurable logic circuit. Thereby, the user design can be implemented by the reconfigurable logic circuit and evaluated by operating the reconfigurable logic circuit on the hardware development platform and in conjunction with the hardware emulation system and any other peripheral systems.

Each interface buffer card 222 includes at least one communication port 226 for coupling the hardware emulation system 200' with one or more target systems 300, communication cable assemblies 400, and/or other external systems or devices. Each communication port 226 includes a connector assembly 226A having a plurality of contacts, pins, or terminals 226B, such as user-definable terminals and/or reserved terminals. Each communication port 226 can have any appropriate number of terminals 226B, which number can be related to the number of communication signals 500 (shown in FIG. 1) to be supported by the communication port 226. The communication signals 500 thereby can be exchanged among the hardware emulation system 200' with one or more target systems 300, communication cable assemblies 400, and/or other external systems or devices, as desired.

The buffer card assembly 220 of the hardware emulation system 200' is illustrated in FIG. 2 as being configured to couple with the target systems 300 via communication cable assemblies 400. Therefore, the buffer card assembly 220 and the communication cable assemblies 400 can form a target interface system 450 for coupling the hardware emulation system 200' and the target systems 300. Although any suitable type of communication cable assemblies 400 can be used to couple the hardware emulation system 200' with the target systems 300, the communication cable assemblies 400 preferably comprise at least one high-density data cable 400' and/or at least one direct attach stimulus cable (not shown).

As shown in FIG. 2, each of the high-density data cables 400' can include an emulator connector assembly 410 and a target connector assembly 420 that are coupled via a communication cable 430. Although shown and described as being provided adjacent to the opposite end regions of the communication cable 430 for purposes of illustration, the emulator connector assembly 410 and the target connector assembly 420 can be associated with any suitable portion, such as an intermediate region, of the communication cable 430 and can be provided in any suitable manner. Being configured to couple with, and/or mate with, communication ports (not shown) of the target systems 300, the target connector assembly 420 is illustrated as comprising a connector assembly 422 and an interface system (or pod) 424. The interface system (or pod) 424 can include analog and/or digital devices and is configured to perform one or more functions associated with the target interface system 450. Preferably, the bulk of the functions associated with the target interface system 450 are performed by the interface system (or pod) 424.

As desired, a legacy target adapter 440 can disposed between the target connector assembly 420 and the target systems 300 as illustrated in FIG. 2. The legacy target adapter 440 can be configured to provide back-compatibility to the legacy form factor for conventional target systems 300, such as conventional target systems 300 supported by Cadence Design Systems, Inc., of San Jose, Calif. In the manner discussed above with regard to the target connector assembly 420, the emulator connector assembly 410 can include a connector assembly (not shown) for coupling with, and/or mating with, the communication ports 226 of the hardware emulation system 200'. Thereby, the hardware emulation system 200' and the target systems 300 can be coupled, and configured to communicate, such that the communication signals 500 are exchanged via the communication cable assemblies 400.

Figure 3:
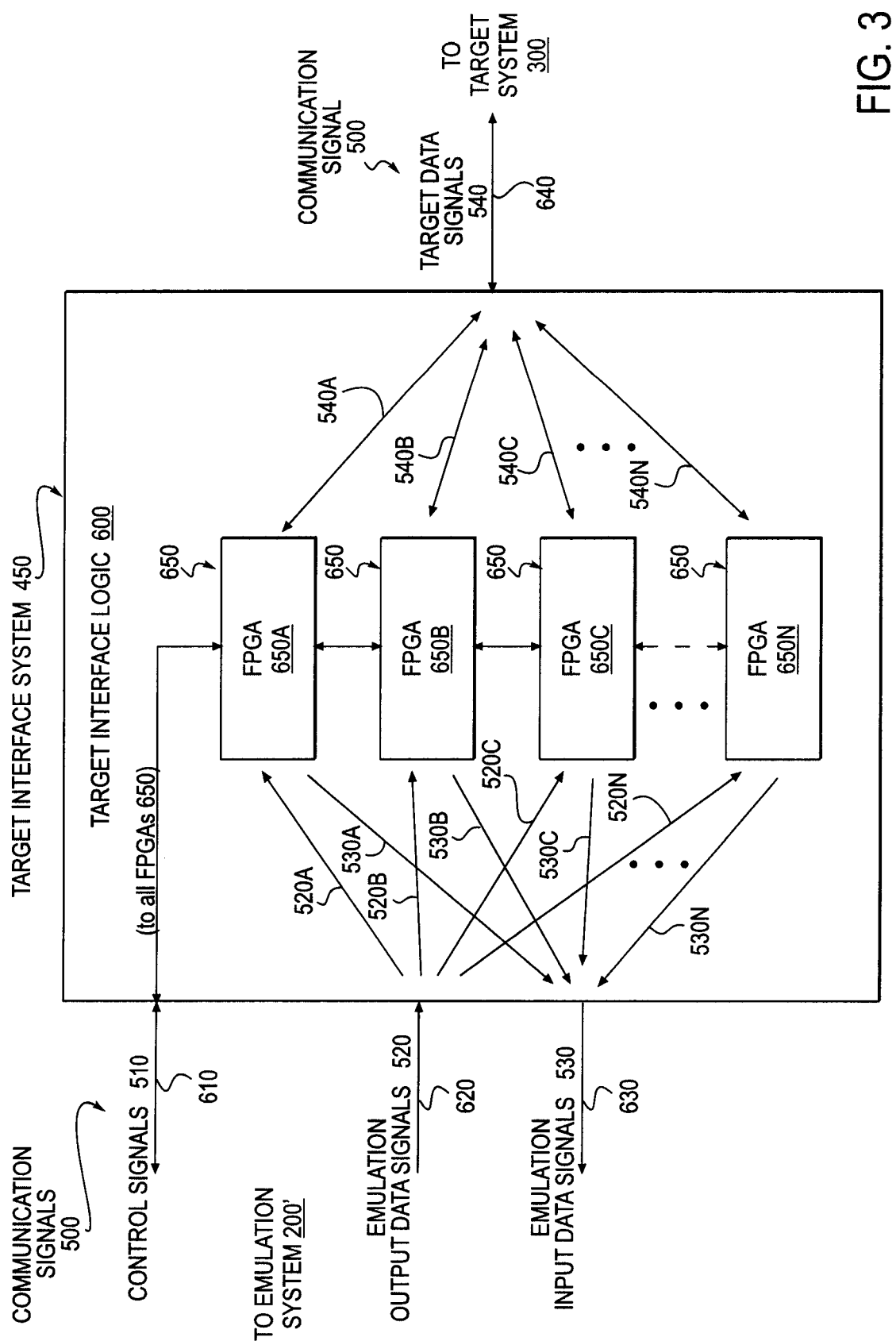
FIG. 3 is an exemplary block diagram illustrating an embodiment of a target interface system for the communication systems of FIGS. 1 and 2 in which the target interface system includes target interface logic that comprises a plurality of field-programmable gate arrays.

In the manner set forth in more detail in co-pending United States Patent Application Ser. No. 11/140,714, entitled "SYSTEM AND METHOD FOR PROVIDING FLEXIBLE SIGNAL ROUTING AND TIMING,", the target interface system 450 can include target interface logic 600 for facilitating exchanges of communication signals 500 between the hardware emulation system 200' and the target system 300 as shown in FIG. 3. Being coupled with, and configured to communicate with, the hardware emulation system 200' and the target system 300, the target interface logic 600 can exchange communication signals 500 with the hardware emulation system 200' and the target system 300. For example, the target interface logic 600 includes one or more control signal connections (or pins) 610 for exchanging control signals 510 with the hardware emulation system 200'.

The target interface logic 600 likewise is illustrated as including at least one emulator data output connections (or pins) 620 for receiving emulator output data signals 520 from the hardware emulation system 200' and at least one emulator data input connections (or pins) 630 for providing emulator input data signals 530 to the hardware emulation system 200'. One or more target I/O connections (or pins) 640 are shown in FIG. 3 whereby the target interface logic 600 and the target system 300 can exchange target data signals 540. Comprising configurable (or reconfigurable) as input connections, output connections, and/or bidirectional connections, the target I/O connections 640 can be configured, as desired, to provide the target data signals 540 to the target system 300 and/or to receive the target data signals 540 from the target system 300. Thereby, the target interface logic 600 can facilitate the exchange of communication signals 500 between the emulation system 200' and the target system 300.

The target interface logic 600 can be provided in any conventional manner and, as shown in FIG. 3, preferably comprises one or more reconfigurable logic devices, such as field-programmable gate arrays (FPGAs) 650 and/or logic cell arrays (LCAs). Exemplary field-programmable gate arrays 650 include the XC4000 FPGA family, which is commercially available from Xilinx, Inc. in San Jose, Calif. Each field-programmable gate array 650 includes a plurality of programmable input/output blocks (not shown) for receiving/sending signals and a plurality of programmable logic blocks (not shown). The programmable logic blocks preferably comprise a plurality of combinational logic elements and/or sequential logic elements.

The field-programmable gate arrays 650 likewise include electrical interconnection segments (not shown) and programmable switch blocks (not shown) for activating/de-activating interconnections between the input/output blocks and the programmable logic blocks. By configuring different interconnection paths, the input/output blocks can be coupled with selected programmable logic blocks, which, in turn, are connectable to specified further programmable logic blocks for each of the field-programmable gate array 650. The programmable logic blocks each likewise can be programmed to perform selected operations. The field-programmable gate arrays 650 thereby can implement predetermined functions by appropriately connecting the input/output blocks and the configured programmable logic blocks within each field-programmable gate array 650.

Any suitable number of field-programmable gate arrays 650 can be applied to implement the target interface logic 600 because the required quantity of programmable logic is relatively small and can reduce overall system costs. The field-programmable gate arrays 650 can be programmed via the hardware emulation system 200' (shown in FIG. 2) and are designed such that each field-programmable gate array 650 is programmed with the same file and at the same time. Thereby, the field-programmable gate arrays 650 effectively operate as a single logical (or composite) field-programmable gate array, and the distribution of the target interface logic 600 among the field-programmable gate arrays 650 is transparent to software.

When the target interface logic 600 comprises a plurality of field-programmable gate arrays 650A-N as illustrated in FIG. 3, the control signals 510 are provided to each of the field-programmable gate arrays 650A-N. The emulator output data signals 520 and the emulator input data signals 530, in contrast, are distributed among the field-programmable gate arrays 650A-N. For example, the emulator output data signals 520 and the emulator input data signals 530 can be respectively divided into groups 520A-N of emulator output data signals 520 and groups 530A-N of emulator input data signals 530. Each group 520A-N can include any suitable number of the emulator output data signals 520; whereas, any appropriate number of the emulator input data signals 530 can be associated with each group 530A-N. The number of the emulator output data signals 520 and the emulator input data signals 530 associated with each of the groups 520A-N, 530A-N, respectively, can be uniform, or different, as desired.

As shown in FIG. 3, the field-programmable gate array 650A can receive the emulator output data signals 520 in the first group 520A from the hardware emulation system 200' as well as provide the emulator input data signals 530 in the first group 520A to the hardware emulation system 200'. The second group 520B of emulator output data signals 520 and the second group 530B of emulator input data signals 530 are illustrated as being exchanged between the hardware emulation system 200' and the field-programmable gate array 650B. The hardware emulation system 200' and the field-programmable gate arrays 650C, 650D likewise can respectively exchange the emulator output data signals 520 in the third and fourth groups 520C, 520D and the emulator input data signals 530 in the third and fourth groups 530C, 530D as set forth in more detail above.

In a similar manner, the target data signals 540 likewise can be divided into groups 540A-N of target data signals 540 when the target interface logic 600 comprises more than one field-programmable gate array 650. The target data signals 540 thereby can be distributed among the field-programmable gate arrays 650. If the target interface logic 600 comprises the field-programmable gate arrays 650A-N as shown in FIG. 3, for example, the target data signals 540 can be divided into groups 540A-N of target data signals 540. Each group 540A-N can include any suitable number of the target data signals 540. The number of the target data signals 540 associated with each group 540A-N can be uniform, or different, as desired.

With reference to the first group 540A of target data signals 540, the field-programmable gate array 650A can provide outgoing target data signals 540 in the first group 540A to the target system 300 and can receive incoming target data signals 540 in the first group 540A from the target system 300. The target data signals 540 associated with the second group 540B can be exchanged between the field-programmable gate array 650B and the target system 300. The field-programmable gate arrays 650C, 650D and the target system 300 likewise can exchange the target data signals 540 in the third and fourth groups 540C, 540D, respectively. In the manner discussed above, the emulator output data signals 520, the emulator input data signals 530, and the target data signals 540 can be divided in any suitable manner among any appropriate number of field-programmable gate arrays 650.

Advantageously, the target interface system 450 is configured to support an extensive range of conventional input/output (I/O) technologies. The input/output technologies can include general and/or special purpose input/output technologies, such as memory interface technologies, with diverse signaling levels, signal technologies, signal terminations, and/or signal drive strengths. The target interface system 450 likewise can support differential communication signals and single-ended communication signals in the manner set forth in more detail in co-pending United States Patent Application Ser. No. 11/140,714, entitled "SYSTEM AND METHOD FOR PROVIDING FLEXIBLE SIGNAL ROUTING AND TIMING,". The hardware emulation system 200' thereby can interface with a wide variety of the target systems 300.

Table 1 provides some illustrative conventional input/output (I/O) technologies that can be supported by the target interface system 450. As shown in Table 1, the input/output technologies can include Low Voltage Complementary Metal Oxide Semiconductor (LVCMOS) technology, Low-voltage differential signaling (LVDS) technology, Differential High Speed Transceiver Logic (HSTL) technology, and/or stub series-terminated logic (SSTL) interface technology with a wide range of output driver supply voltages $V_{IO}$ (shown in FIG. 4), such as 1.2 VDC, 1.5 VDC, 1.8 VDC, 2.5 VDC, and/or 3.3 VDC, and diverse output drive strengths, including 8 mA, 12 mA, 16 mA, and/or 24 mA, as desired. The target interface system 450 likewise is shown as being configurable to support source terminations, such as 25 Ω source terminations and/or 50 Ω source terminations, and/or a variety of input reference voltages $V_{REF}$ (shown in FIG. 5A), such as 0.75 VDC, 0.9 VDC, 1.1 VDC, 1.25 VDC, and/or 1.5 VDC, as desired. Although selected conventional input/output technologies are included in Table 1 for purposes of illustration, the target interface system 450 is configurable to support any conventional input/output technology.

TABLE 1

Illustrative Conventional Input/Output (I/O) Technologies

| Input/Output (I/O) Technology | Base I/O Type | Output Drive Strength | Output Driver Supply Voltage ($V_{IO}$) | Input Reference Voltage ($V_{REF}$) |
|---|---|---|---|---|
| LVCMOS12-8 | 1.2 V CMOS | 8 mA | 1.2 V | N/A |
| LVCMOS12-12 | | 12 mA | | |
| LVCMOS12-16 | | 16 mA | | |
| LVCMOS12-series | | 50 Ω Source Termination | | |
| LVCMOS15-8 | 1.5 V CMOS | 8 mA | 1.5 V | N/A |
| LVCMOS15-12 | | 12 mA | | |
| LVCMOS15-16 | | 16 mA | | |
| LVCMOS15-series | | 50 Ω Source Termination | | |
| LVCMOS18-8 | 1.8 V CMOS | 8 mA | 1.8 V | N/A |
| LVCMOS18-12 | | 12 mA | | |
| LVCMOS18-16 | | 16 mA | | |
| LVCMOS18-series | | 50 Ω Source Termination | | |
| LVCMOS25-8 | 2.5 V CMOS | 8 mA | 2.5 V | N/A |
| LVCMOS25-12 | | 12 mA | | |
| LVCMOS25-16 | | 16 mA | | |
| LVCMOS25-24 | | 24 mA | | |

TABLE 1-continued

Illustrative Conventional Input/Output (I/O) Technologies

| Input/Output (I/O) Technology | Base I/O Type | Output Drive Strength | Output Driver Supply Voltage ($V_{IO}$) | Input Reference Voltage ($V_{REF}$) |
|---|---|---|---|---|
| LVCMOS25-series | | 50 Ω Source Termination | | |
| LVCMOS33-8 | 3.3 V CMOS | 8 mA | 3.3 V | N/A |
| LVCMOS33-12 | | 12 mA | | |
| LVCMOS33-16 | | 16 mA | | |
| LVCMOS33-24 | | 24 mA | | |
| LVCMOS33-series | | 50 Ω Source Termination | | |
| LVDS-25-input | 2.5 V LVDS | N/A | 2.5 V | N/A |
| LVDS-25-output | 2.5 V LVDS | N/A | 2.5 V | N/A |
| LVDS-25-input/output | 2.5 V LVDS | N/A | 2.5 V | N/A |
| LVDS-33-input | 3.3 V LVDS | N/A | 3.3 V | N/A |
| LVDS-33-output | 3.3 V LVDS | N/A | 3.3 V | N/A |
| LVDS-33-input/output | 3.3 V LVDS | N/A | 3.3 V | N/A |
| HSTL-II-15 | HSTL Class II (1.5 V) | N/A | 1.5 V | 0.75 V |
| HSTL-IV-15 | HSTL Class IV (1.5 V) | N/A | 1.5 V | 0.9 V |
| HSTL-II-18 | HSTL Class II (1.8 V) | N/A | 1.8 V | 0.9 V |
| HSTL-IV-18 | HSTL Class IV (1.8 V) | N/A | 1.8 V | 1.1 V |
| SSTL2-II | SSTL2 Class II | 25 Ω Source Termination | 2.5 V | 1.25 V |
| SSTL3-II | SSTL3 Class II | 25 Ω Source Termination | 3.3 V | 1.5 V |
| EMPTY | N/A | High Impedance | N/A | N/A |

The target interface system 450 can facilitate communications between the hardware emulation system 200' and the target systems 300 in any suitable manner. For example, the target interface system 450 as a whole can be configured to selectably support a predetermined input/output technology. The target interface system 450 likewise can simultaneously support a plurality predetermined input/output technologies as desired. A first group of target input/output (I/O) connections (or pins) 640 of the target interface system 450 thereby can communicate with the target system 300 via target data signals 540 of a first predetermined input/output technology; whereas, a second group of target I/O connections 640 and the target system 300 can communicate via target data signals 540 of a second predetermined input/output technology. If the target interface system 450 comprises a plurality of reconfigurable logic devices, such as field-programmable gate arrays (FPGAs) 650 as shown in FIG. 3, each group of target I/O connections 640 can be associated with a selected field-programmable gate array 650 and/or with a selected pin group of one or more of the field-programmable gate arrays 650.

The input/output technology can be selected by providing the target interface system 450 with information that identifies the selected input/output technology for the target data signals 540. If the target interface system 450 comprises the plurality of field-programmable gate arrays 650 as shown in FIG. 3, the input/output technology can be selected by downloading an image (not shown) into each of the field-programmable gate arrays 650. The image includes information for identifying the selected input/output technology and for configuring the field-programmable gate arrays 650 to support the selected input/output technology. A different image can be provided for each input/output technology supported by the target interface system 450 to form a library of images for the target interface system 450.

Since the images can represent different input/output technologies, each image preferably is associated with a predetermined output driver supply voltage $V_{IO}$ that is appropriate for the relevant input/output technology. Each image includes the appropriate predetermined output driver supply voltage $V_{IO}$ to inhibit damage to the field-programmable gate arrays 650 and/or to the target system 300 due to application of an incompatible output driver supply voltage $V_{IO}$. Therefore, the appropriate image preferably is downloaded into the field-programmable gate arrays 650 prior to runtime. The field-programmable gate arrays 650 thereby can be configured to support the selected input/output technology before the first exchange of target data signals 540.

Figure 4:
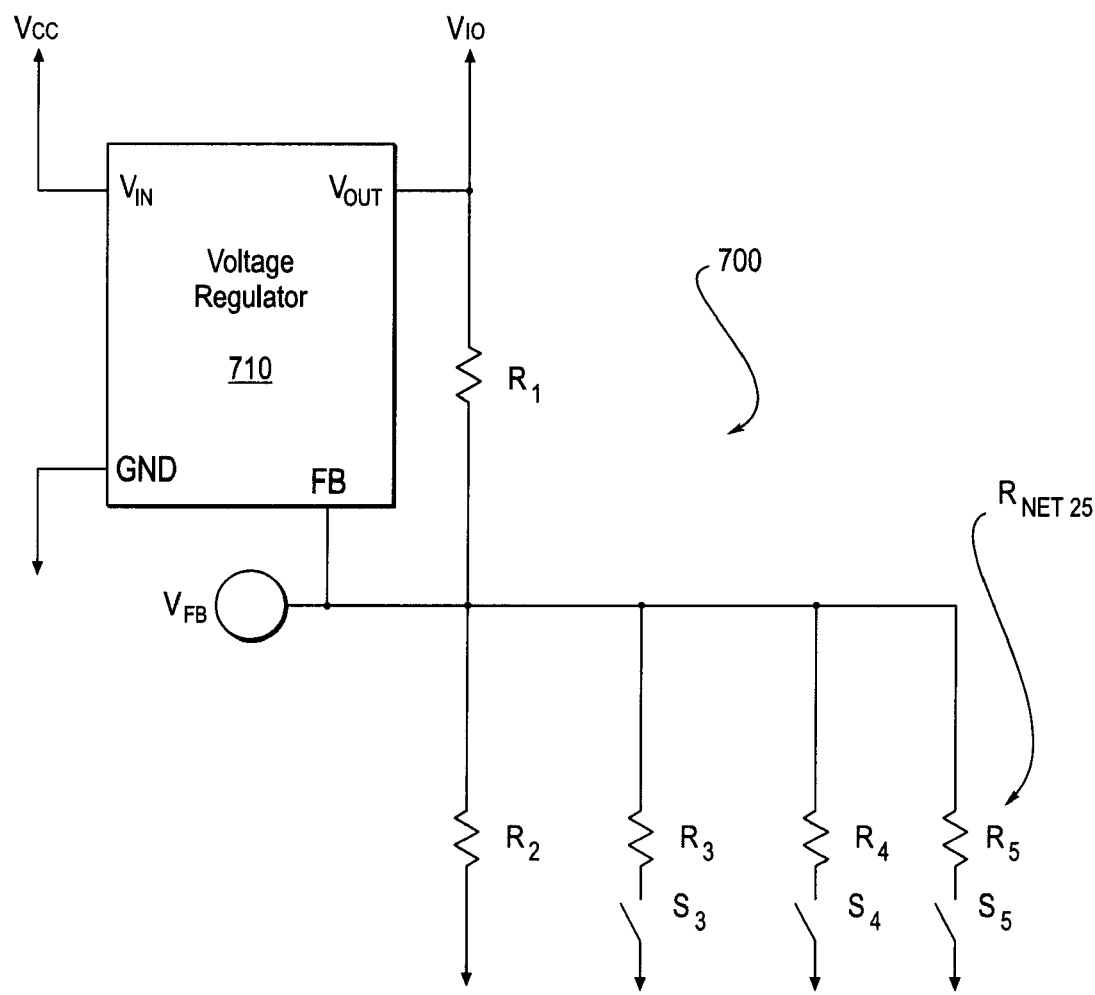
FIG. 4 is an exemplary detail drawing illustrating an embodiment of a source voltage generator for the target interface system of FIG. 3 in which the source voltage generator can provide a selected output driver supply voltage.

The target interface system 450 can provide the output driver supply voltage $V_{IO}$ in any conventional manner. For example, a demonstrative source voltage generator 700 for providing the output driver supply voltage $V_{IO}$ is illustrated in FIG. 4. As shown in FIG. 4, the source voltage generator 700 can include a conventional voltage regulator 710 and one or more voltage selection elements for configuring the source voltage generator 700 to provide the predetermined output driver supply voltage $V_{IO}$. Although shown and described with reference to FIG. 4 as including a plurality of resistive elements R1-5 and a plurality of switching elements S3-S5 for purposes of illustration, the voltage selection elements can be provided via any conventional type and/or arrangement of electronic components, including passive components and/or semiconductor components. The switching elements S3-S5, for example, can comprise mechanical and/or solid state switches, such as field effect transistors (FETs). As desired, at least one of the voltage selection elements can be provided by one or more of the field-programmable gate arrays 650 (shown in FIG. 3), such as by configuring the input/output blocks (IOBs) 655 (shown in FIG. 7A) of the relevant field-programmable gate arrays 650 in the manner that is well-known in the art.

Upon receiving a supply voltage $V_{CC}$ from an external voltage source (not shown) as an input voltage $V_{IN}$, the voltage regulator 710 provides an output voltage $V_{OUT}$. The voltage regulator 710 can regulate the output voltage $V_{OUT}$ in any conventional manner to provide the predetermined output driver supply voltage $V_{IO}$. As shown in FIG. 4, for example, the voltage regulator 710 likewise can provide a feedback voltage $V_{FB}$. Being configured to maintain the feedback voltage $V_{FB}$ at a target feedback voltage level, the voltage regulator 710 can adjust the output voltage $V_{OUT}$, as needed, to maintain the target feedback voltage level. The voltage selection elements are selectable and/or configurable such that the voltage regulator 710 can provide the output voltage $V_{OUT}$ as the predetermined output driver supply voltage $V_{IO}$ when the feedback voltage $V_{FB}$ reaches, and is maintained, at the target feedback voltage level. The source voltage generator 700 thereby can provide the predetermined output driver supply voltage $V_{IO}$ in the manner set forth above.

The resistive elements R1-R5 and a plurality of switching elements S3-S5 provide an adjustable voltage divider network for configuring the source voltage generator 700 to provide the predetermined output driver supply voltage $V_{IO}$. As shown in FIG. 4, the voltage regulator 710 includes an output voltage terminal and an feedback voltage terminal FB, which are coupled via the resistive element R1. The resistive element R2 is disposed between the feedback voltage terminal FB of the voltage regulator 710 and ground. The series arrangement of the resistive element R3 and the switch element S3 likewise is disposed between the feedback voltage terminal FB and ground. Similarly, the resistive element R4 and the switch element S4 as well as the resistive element R5 and the switch element S5 each can be disposed in a series arrangement and disposed between the feedback voltage terminal FB and ground as illustrated in FIG. 4.

Figure 6:
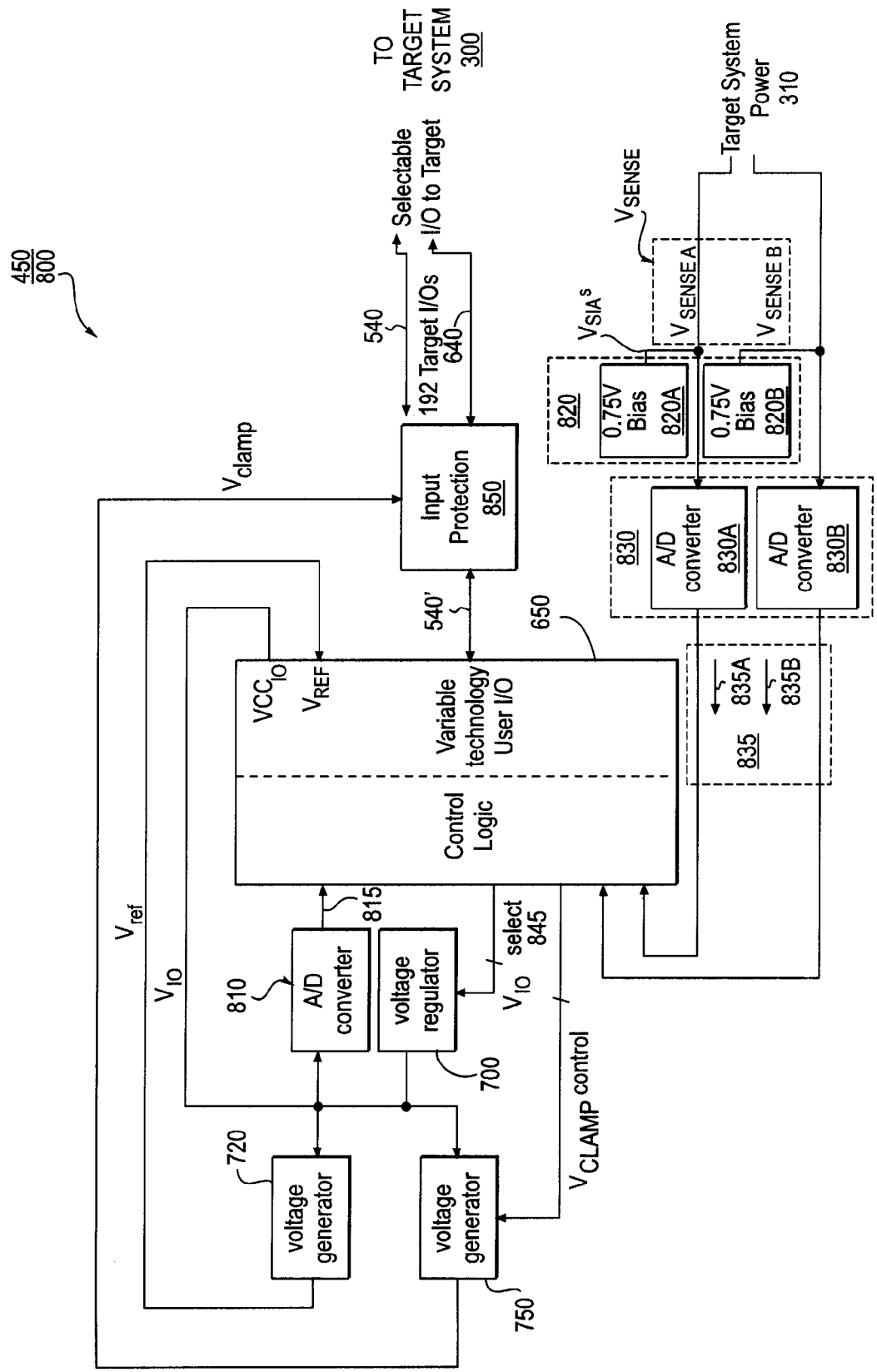
FIG. 6 is an exemplary block diagram illustrating an embodiment of a control system for the target interface system of FIG. 3.

The net resistance $R_{NET25}$ of the substantially parallel configuration of the resistive elements R2-R5 can be adjusted, as desired, by activating and/or deactivating one or more of the switch element S3-S5 by one or more of the field-programmable gate arrays 650, such as via at least one $V_{IO}$ select signal 845 (shown in FIG. 6). The output driver supply voltage $V_{IO}$ therefore can be determined in accordance with Equation 1.

$$V_{IO}=V_{FB}*(1+R1/R_{NET25})\qquad\text{Equation 1}$$

where $R_{NET25}$ is the net resistance of the substantially parallel configuration of the resistive elements R2-R5. For example, if the voltage regulator 710 is configured to provide a feedback voltage $V_{FB}$ of approximately 0.8 VDC, the resistive elements R1-R5 can be respectively provided as with the resistance values of 249KΩ, 287KΩ, 649KΩ, 287KΩ, and 249KΩ. The source voltage generator 700 thereby can provide the predetermined output driver supply voltage $V_{IO}$ in accordance with the switch element configurations set forth below in Table 2.

TABLE 2

Illustrative Switch Element Configurations for Exemplary Source Voltage Generator

| Switch Element Configuration | | | |
|---|---|---|---|
| Switch Element S3 | Switch Element S4 | Switch Element S5 | Output Driver Supply Voltage ($V_{IO}$) |
| OPEN | OPEN | OPEN | 1.5 VDC |
| CLOSED | OPEN | OPEN | 1.8 VDC |

TABLE 2-continued

Illustrative Switch Element Configurations for Exemplary Source Voltage Generator

| Switch Element Configuration | | | |
|---|---|---|---|
| Switch Element S3 | Switch Element S4 | Switch Element S5 | Output Driver Supply Voltage ($V_{IO}$) |
| CLOSED | CLOSED | OPEN | 2.5 VDC |
| CLOSED | CLOSED | CLOSED | 3.3 VDC |

As desired, the target interface system 450 likewise can be configured to provide any auxiliary voltages associated with the relevant input/output technology. Exemplary auxiliary voltages can include a reference voltage $V_{REF}$ and/or a clamp voltage $V_{CLAMP}$ as shown and described with reference to FIGS. 5A-B. The target interface system 450 (shown in FIG. 2) can provide the auxiliary voltages in any conventional manner and preferably controls the auxiliary voltages as a function of the output driver supply voltage $V_{IO}$ to limit the possibility of any voltage inconsistencies. Although the control of the auxiliary voltages can include software control and/or runtime control, the target interface system 450 advantageously provides at least some analog control to avoid any accidental out-of-range voltages from damaging the target interface system 450, the target system 300 (shown in FIG. 2), and/or the hardware emulation system 200' (shown in FIG. 2).

Figure 5A:
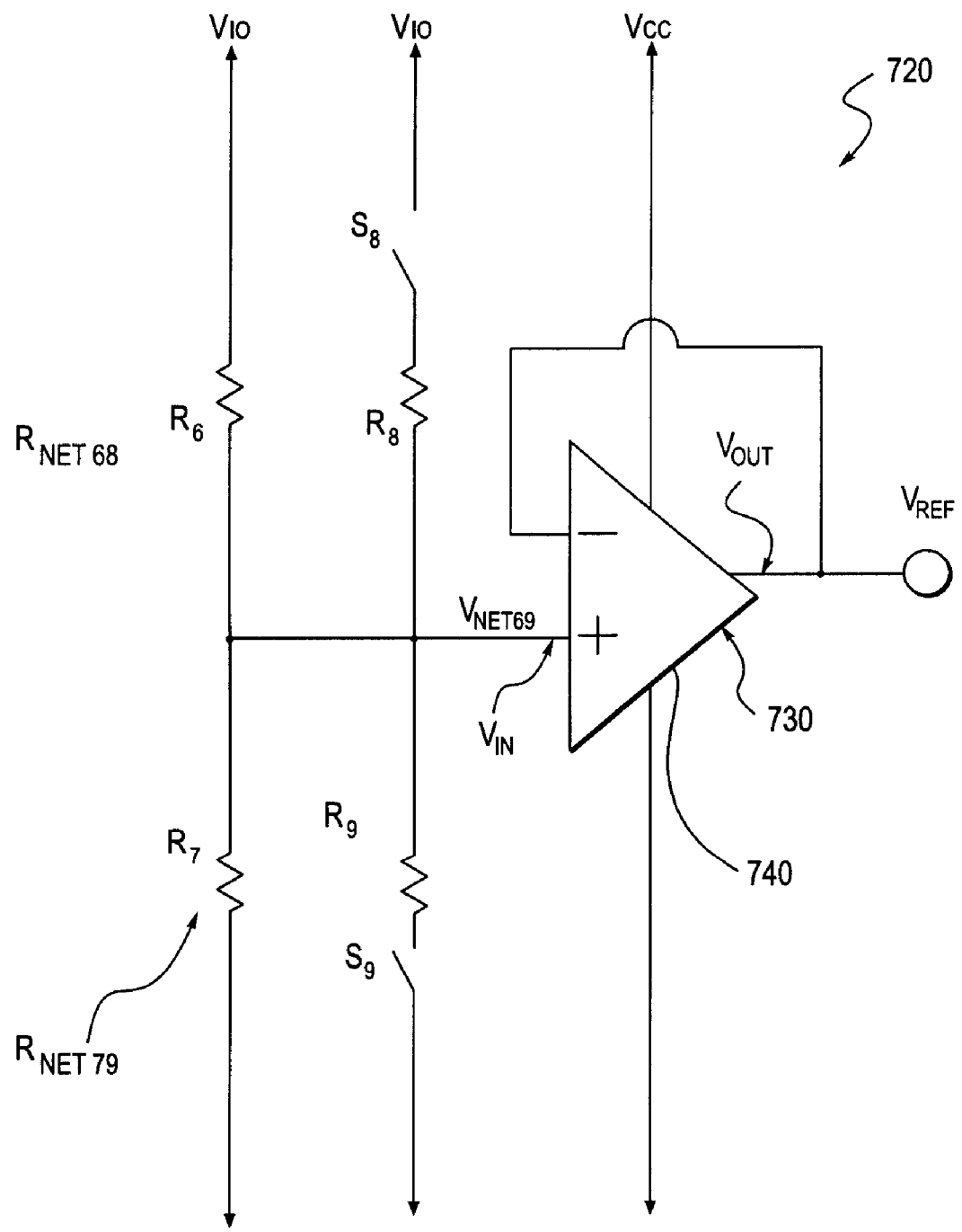
FIG. 5A is an exemplary detail drawing illustrating an embodiment of a reference voltage generator for the target interface system of FIG. 3 in which the reference voltage generator can provide a selected reference voltage that is proportional to the output driver supply voltage of FIG. 4.

Turning to FIG. 5A, a reference voltage generator 720 for providing a selected reference voltage $V_{REF}$ is shown. Some input/output technologies compare input signal voltages with a reference voltage, such as the reference voltage $V_{REF}$. Comprising a function of the output driver supply voltage $V_{IO}$, the reference voltage $V_{REF}$ is shown as being provided in a manner such that the reference voltage $V_{REF}$ is proportional to the output driver supply voltage $V_{IO}$. The reference voltage generator 720 can be provided in any conventional manner and, as illustrated in FIG. 5A, can include a conventional amplifier circuit 730 and one or more voltage selection elements for configuring the amplifier circuit 730 to provide the selected reference voltage $V_{REF}$. For example, the amplifier circuit 730 can comprise a conventional voltage follower circuit comprising an operational amplifier 740; whereas, the voltage selection elements can be provided in the manner set forth in more detail above with reference to FIG. 4.

The voltage selection elements of FIG. 5A include a plurality of resistive elements R6-R9 and a plurality of switching elements S8, S9. In the manner discussed above, the resistive elements R6-R9 and the switching elements S8, S9 provide an adjustable voltage divider network for configuring the reference voltage generator 720 to provide the elected reference voltage $V_{REF}$. As shown in FIG. 5A, the amplifier circuit 730 includes at least one input voltage terminal $V_{IN}$ for receiving input voltage $V_{NET69}$ from the voltage selection elements and an output voltage terminal $V_{OUT}$ for providing the selected reference voltage $V_{REF}$. Although the amplifier circuit 730 is illustrated as being powered via the supply voltage $V_{CC}$ from the external voltage source (not shown), the input voltage $V_{NET69}$ from the voltage selection elements, and therefore the selected reference voltage $V_{REF}$, are proportional to the output driver supply voltage $V_{IO}$.

A series arrangement of the resistive element R6 and the resistive element R7 is disposed between the output driver supply voltage $V_{IO}$ and ground. The junction of the resistive elements R6, R7 is coupled with the relevant input voltage terminal $V_{IN}$ of the amplifier circuit 730. The input voltage terminal $V_{IN}$ likewise is coupled with the output driver supply voltage $V_{IO}$ via a series arrangement of the resistive element R8 and the switch element S8 and is coupled with ground via a series arrangement of the resistive element R9 and the switch element S9. Since the input voltage terminal $V_{IN}$ typically comprises a high-impedance input terminal, the input voltage $V_{NET69}$ is proportional to the output driver supply voltage $V_{IO}$ and can be determined via a suitable selection and/or configuration of the voltage selection elements. Upon receiving the predetermined input voltage $V_{NET69}$, the amplifier circuit 730, shown as comprising the conventional voltage follower circuit, can provide the predetermined input voltage $V_{NET69}$ as the reference voltage $V_{REF}$. The reference voltage $V_{REF}$ thereby is proportional to the output driver supply voltage $V_{IO}$.

In the manner set forth in more detail above with regard to the resistance $R_{NET25}$ (shown in FIG. 4), a net resistance $R_{NET68}$ of the resistive elements R6, R8 can be adjusted, as desired, by activating (and/or deactivating) the switch element S8; whereas, the switch element S9 can be activated and/or deactivated to adjust a net resistance $R_{NET79}$ of the resistive elements R7, R9. The switch elements S8, S9 can be activated (and/or deactivated) via one or more of the field-programmable gate arrays 650 (shown in FIG. 3). Information for activating (and/or deactivating) the switch elements S8, S9 can be included in the image downloaded into each of the field-programmable gate arrays 650 as discussed above. The ratio of the reference voltage $V_{REF}$ to the output driver supply voltage $V_{IO}$ therefore can be determined in accordance with Equation 2.

$$V_{REF}/V_{IO} = R_{NET79}/(R_{NET68} + R_{NET79}) \quad \text{Equation 2}$$

where $R_{NET68}$ is the net resistance of the substantially parallel configuration of the resistive elements R6, R8 and $R_{NET79}$ is the net resistance of the substantially parallel configuration of the resistive elements R7, R9.

The reference voltage $V_{REF}$ preferably is disposed within a narrow range of reference voltages and typically is centered approximately around one half of the output driver supply voltage $V_{IO}$. To center the reference voltage $V_{REF}$ around one half of the output driver supply voltage $V_{IO}$, the resistive elements R6, R7 are provided with approximately the same resistance value. The voltage range of the reference voltage $V_{REF}$ can be determined by selecting suitable resistance values of the resistive elements R8, R9 and by activating (and/or deactivating) the appropriate switching elements S8, S9. For example, if the amplifier circuit 730 comprises the conventional voltage follower circuit, the resistive elements R6-R9 can be respectively provided with the resistance values of 54.9 KΩ, 54.9 KΩ, 103 KΩ, and 249 KΩ. The reference voltage generator 720 thereby can provide the selected reference voltage $V_{REF}$ in accordance with the switch element configurations set forth below in Table 3.

TABLE 3

Illustrative Switch Element Configurations
for Exemplary Reference Voltage Generator Switch Element Configuration

| Switch Element S8 | Switch Element S9 | Ratio of Reference Voltage ($V_{REF}$) to Output Driver Supply Voltage ($V_{IO}$) |
|---|---|---|
| OPEN | OPEN | 0.500 |
| CLOSED | OPEN | 0.450 |
| OPEN | CLOSED | 0.605 |

Figure 5B:
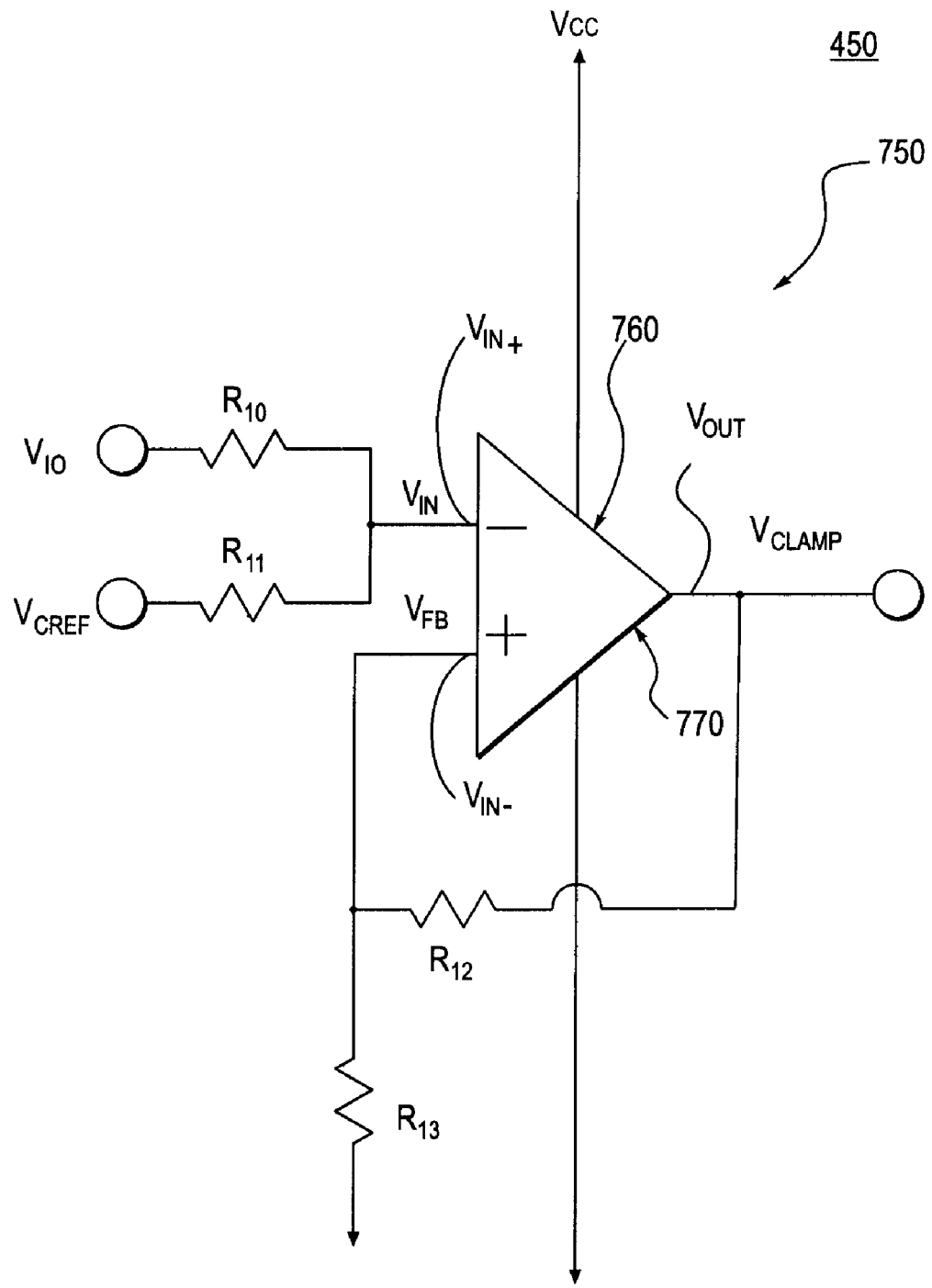
FIG. 5B is an exemplary detail drawing illustrating an embodiment of a clamp voltage generator for the target interface system of FIG. 3 in which the clamp voltage generator can provide a selected clamp voltage that is greater than the output driver supply voltage of FIG. 4 by a predetermined voltage.

Whereas the reference voltage $V_{REF}$ of FIG. 5A was proportional to the output driver supply voltage $V_{IO}$, the auxiliary voltages can be provided as any suitable function of the output driver supply voltage $V_{IO}$. Turning to FIG. 5B, for example, a clamp voltage generator 750 for providing a selected clamp voltage $V_{CLAMP}$. The clamp voltage $V_{CLAMP}$ provides protection for the gates of selected field effect transistors (FETs), such as field effect transistors 852 (shown in FIG. 7A) that are used as switches, of the target interface system 450. The selected field effect transistors can be configured to operate as clamp diodes when an over-voltage condition arises one or more associated target I/O connections (or pins) 640 (shown in FIG. 3). The clamp voltage generator 750 therefore preferably provides a clamp voltage $V_{CLAMP}$ that is greater than the output driver supply voltage $V_{IO}$ by a predetermined voltage.

The clamp voltage generator 750 can be provided in any conventional manner and, as illustrated in FIG. 5B, can comprise a conventional amplifier circuit 760. The amplifier circuit 760 of FIG. 5B includes an operational amplifier 770 and a plurality of resistive elements R10-R13, each of which can be respectively provided in the manner discussed in more detail above with reference to the operational amplifier 740 (shown in FIG. 5A) and the resistive elements R1-R5 (shown in FIG. 4). Being powered via the supply voltage $V_{CC}$ from the external voltage source (not shown), the operational amplifier 770 includes a noninverting input terminal $V_{IN+}$, an inverting input terminal $V_{IN-}$, and an output terminal $V_{OUT}$ for providing the clamp voltage $V_{CLAMP}$. The resistive element R12 is shown as providing a feedback path from the output terminal $V_{OUT}$ to the inverting input terminal $V_{IN-}$; whereas, the inverting input terminal $V_{IN-}$ is coupled to ground via the resistive element R13.

The noninverting input terminal $V_{IN+}$ of the operational amplifier 770 is shown as being coupled with the output driver supply voltage $V_{IO}$ via the resistive element R10 and with a clamp reference voltage $V_{CREF}$ via the resistive element R11. The clamp reference voltage $V_{CREF}$ can be provided in any conventional manner, including via an external reference voltage source (not shown) and/or in the manner set forth above with regard to the reference voltage $V_{REF}$ (shown in FIG. 5A), and can have a value that is appropriate for the relevant input/output technology. For example, if the clamp reference voltage $V_{CREF}$ is approximately equal to 2.5 VDC, the resistive elements R10 and R12 each can have the resistance value of 100 KΩ; whereas, each of the resistive elements R11 and R13 can be provided with the resistance value of 249 KΩ. The clamp voltage generator 750 thereby can provide the clamp voltage $V_{CLAMP}$ with a potential that is approximately one volt (1 VDC) greater than the output driver supply voltage $V_{IO}$.

Each of the voltages generated by the target interface system 450, including the output driver supply voltage $V_{IO}$, the reference voltage $V_{REF}$ (shown in FIG. 5A), and the clamp voltage $V_{CLAMP}$, preferably default to their respective least dangerous state. The output driver supply voltage $V_{IO}$, for example, can default to its lowest nominal voltage value, such as 1.5 VDC as shown in Table 2. The lowest nominal voltage value of the output driver supply voltage $V_{IO}$ preferably is approximately equal to the core voltage of the field-programmable gate arrays 650 (shown in FIG. 3). Thereby, the possibility that the generated voltages will damage the target interface system 450 can be reduced. The possibility of damage to the target system 300 (shown in FIG. 3) from the generated voltages likewise can be reduced in case the target system 300 is coupled with the target interface system 450 before the field-programmable gate arrays 650 have been programmed.

Returning to FIG. 4, for example, each of the switching elements S3-S5 preferably defaults to an open state such that the source voltage generator 700 provides the lowest output driver supply voltage $V_{IO}$. For example, the selection connections between the field-programmable gate arrays 650 and the switching elements S3-S5 can be biased to an appropriate logic level, such as a low logic level, such that the switching elements S3-S5 default to the open states before the field-programmable gate arrays 650 have been programmed. The resistive elements R1-R5 likewise are configured such that disconnection of any of the resistive elements R2-R5 and/or disconnection of any of the switching elements S3-S5 can result in the source voltage generator 700 providing the lowest output driver supply voltage $V_{IO}$. Further, even if each of the switching elements S3-S5 is closed, the source voltage generator 700 does not provide a potential that can exceed the maximum output driver supply voltage $V_{IO}$.

FIG. 6 shows an exemplary block diagram illustrating an embodiment of a control system 800 for the target interface system 450. The control system 800 is configured to monitor, preferably continuously monitor, the output driver supply voltage $V_{IO}$ and to disable the target I/O connections (or pins) 640 upon detection of any problems. As shown in FIG. 6, the control system 800 includes an analog-to-digital conversion (ADC) system 810 for receiving the output driver supply voltage $V_{IO}$ and for converting the received output driver supply voltage $V_{IO}$ into a digital signal 815. The analog-to-digital conversion system 810 provides the digital signal 815 to one or more of the field-programmable gate arrays 650. The field-programmable gate arrays 650 thereby can monitor the output driver supply voltage $V_{IO}$ to confirm that the output driver supply voltage $V_{IO}$ remains within a predetermined supply voltage range. If the field-programmable gate arrays 650 determine that the output driver supply voltage $V_{IO}$ is outside the predetermined supply voltage range, the field-programmable gate arrays 650 can disable the target I/O connections 640 to prevent any damage to the target system 300.

The control system 800 likewise can include input/output protection circuitry for inhibiting the target interface system 450 from being damaged by the target system 300. As illustrated in FIG. 6, for example, the control system 800 can sense and monitor at least one target system voltage $V_{SENSE}$ provided by a target power system 310 of the target system 300. If the control system 800 monitors two or more target system voltages $V_{SENSE}$, such as target system voltages $V_{SENSEA}$ and $V_{SENSEB}$, the target system voltages $V_{SENSEA}$ and $V_{SENSEB}$ can comprise uniform and/or different target system voltages $V_{SENSE}$, as desired. It may be advantageous to provide redundant monitoring of important target system voltages $V_{SENSE}$, such as an input/output voltage rail, of the target system 300.

The target system voltages $V_{SENSE}$ can be sensed and/or monitored in any conventional manner. The control system 800 can include at least one analog-to-digital conversion (ADC) system 830 for receiving the relevant target system voltage $V_{SENSE}$ and for converting the received target system voltage $V_{SENSE}$ into a digital signal 835 in the manner discussed in more detail above with reference to the analog-to-digital conversion system 810. Being shown as configured to sense and monitor the target system voltages $V_{SENSEA}$ and $V_{SENSEB}$, the control system 800 can include a first analog-to-digital conversion system 810A for sensing and monitoring the first target system voltage $V_{SENSEA}$ and a second analog-to-digital conversion system 810B for sensing and monitoring the second target system voltage $V_{SENSEB}$.

The analog-to-digital conversion systems 830 provide the digital signals 835 to one or more of the field-programmable gate arrays 650. The field-programmable gate arrays 650 thereby can monitor the target system voltages $V_{SENSEA}$ and $V_{SENSEB}$ to confirm that the target system voltages $V_{SENSEA}$ and $V_{SENSEB}$ remain within respective predetermined target system voltage ranges. If the field-programmable gate arrays 650 determine that one or more of the target system voltages $V_{SENSEA}$ and $V_{SENSEB}$ is outside the relevant predetermined target system voltage range, the field-programmable gate arrays 650 can disable the target I/O connections 640. The control system 800 thereby can prevent any damage to the target interface system 450 and/or the target system 300 from the application of one or more incompatible target system voltages $V_{SENSE}$.

Advantageously, the control system 800 can detect an extensive range of target system faults and provide a variety of suitable system responses for responding to each type of target system faults. The control system 800 thereby can further protect the target interface system 450 and/or the target system 300 from damage. As shown in FIG. 6, one or more of the signal lines coupling the analog-to-digital conversion systems 830 with the target power system 310 can be provided with a biasing system 820 for biasing the associated signal line to a predetermined voltage level $V_{BIAS}$. The biasing systems 820 can be provided in any conventional manner, such as via one or more pull-up resistive elements and/or a pull-down resistive elements, such that the voltage level $V_{BIAS}$ can be uniform and/or different among the biasing systems 820.

Preferably, the voltage level $V_{BIAS}$ is easily distinguishable from each valid target system voltage $V_{SENSE}$ and comprises a low voltage level, such as 0.75 VDC, to avoid damaging the target interface system 450 and/or the target system 300. By injecting the voltage level $V_{BIAS}$ onto the signal lines coupling the analog-to-digital conversion systems 830 with the target power system 310, the control system 800 can detect the presence (or absence) of a target system 300. In other words, if one or more of the analog-to-digital conversion system 830 provides the field-programmable gate arrays 650 with a digital signal 835 associated with the voltage level $V_{BIAS}$, the field-programmable gate arrays 650 can associate the digital signal 835 with the absence of a target system 300 in the conventional manner.

The control system 800 likewise can detect other types of target system faults, such as an overvoltage condition and/or an undervoltage condition, for each of the monitored target system voltages $V_{SENSE}$. Therefore, the control system 800 can monitor one or more target system voltages $V_{SENSE}$ for one or more target system faults, individually and/or in combination. By monitoring a sufficient number of the target system voltages $V_{SENSE}$ for an appropriate combination of target system faults, the control system 800 can more suitably respond to any target system faults. Upon detecting a target system fault, the control system 800 provide a suitable system response, such as disabling the target I/O connections 640 and/or alerting the system operator. The control system 800 thereby can protect the target interface system 450 and/or the target system 300 from damage. Table 4 illustrates the control system 800 being configured to monitor a selected target system voltage $V_{SENSE}$ with an expected voltage of 2.5 VDC and to detect, based upon the selected target system voltage $V_{SENSE}$, the presence of a target system 300 as well as any overvoltage and undervoltage conditions.

TABLE 4

Illustrative Target System Faults for Selected Measurements of Exemplary Target System Voltage with Expected Voltage of 2.5 VDC

| Voltage Ranges of Target System Voltage ($V_{SENSE}$) | | Illustrative Target System Faults | | |
|---|---|---|---|---|
| Minimum Voltage | Maximum Voltage | Target System Present | Under-Voltage Condition | Over-Voltage Condition |
| — | 0.7 VDC | YES | YES | NO |
| 0.7 VDC | 0.8 VDC | NO | DON'T CARE | DON'T CARE |
| 0.8 VDC | 2.4 VDC | YES | YES | NO |
| 2.4 VDC | 2.6 VDC | YES | NO | NO |
| 2.6 VDC | — | YES | NO | YES |

As illustrated in FIG. 6, the control system 800 can include an input protection system 850 for protecting the target interface system 450 from excessively high voltages that may be driven by the target system 300. Being disposed between the field-programmable gate array 650 and the relevant target I/O connections 640, the input protection system 850 is configured to receive the target data signals 540 with a first maximum voltage level $V_{MAX}$ from the target system 300 and to provide therefrom modified target data signals 540' with a second, lower maximum voltage level $V_{MAX}'$ to the field-programmable gate arrays 650. The input protection system 850 thereby limits the voltage level $V_{MAX}'$ of the modified target data signals 540' that reach the field-programmable gate arrays 650, preferably limiting the modified target data signals 540' to a maximum voltage level $V_{MAX}'$ that is less than or equal to the output driver supply voltage $V_{IO}$.

Figure 7A:
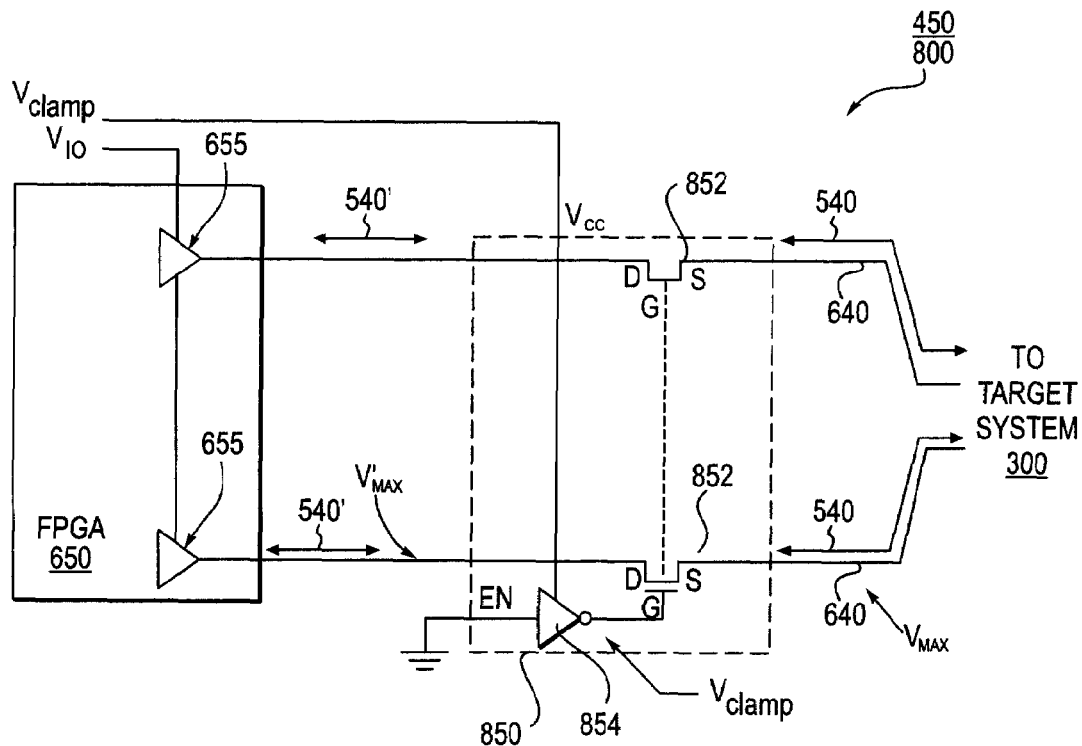
FIG. 7A is an exemplary detail drawing illustrating an embodiment of an input protection system for the control system of FIG. 6.

The input protection system 850 can be provided in any conventional manner, and an exemplary embodiment of the input protection system 850 is shown in FIG. 7A. As illustrated in FIG. 7A, the input protection system 850 can include a plurality of field effect transistors (FETs) 852 and a buffer 854 for providing the clamp voltage $V_{CLAMP}$ to the gate terminals G of each field effect transistor 852. The drain terminal D and the source terminal S of each field effect transistor 852 is respectively shown as being coupled with a relevant field-programmable gate array pin and an associated target I/O connection 640. Each field effect transistor 852 likewise is configured to conduct only when the gate-source voltage $V_{GS}$ of the field effect transistor 852 exceeds a predetermined voltage, such as one volt. The predetermined gate-source voltage $V_{GS}$ at which the field effect transistors 852 can conduct preferably is uniform among the field effect transistors 852.

During normal operation, the buffer 854 is enabled via the enable terminal EN to provide the clamp voltage $V_{CLAMP}$ to the gate terminals G of the field effect transistors 852; whereas, the target data signals 540 are provided on the source terminal S of the field effect transistors 852. The gate-source voltage $V_{GS}$ of a selected field effect transistor 852 is equal to the difference of the clamp voltage $V_{CLAMP}$ and the relevant target data signals 540. Therefore, the selected field effect transistor 852 can conduct only when the difference of the clamp voltage $V_{CLAMP}$ and the maximum voltage level $V_{MAX}$ of the relevant target data signals 540 is less than one volt in accordance with Equation 3.

$$V_{GS} = (V_{CLAMP} - V_{MAX}) > 1 \text{ Volt} \qquad \text{Equation 3}$$

In the manner discussed in more detail above with regard to FIG. 5B, the clamp voltage $V_{CLAMP}$ is a function of the output driver supply voltage $V_{IO}$ and preferably is greater than and/or approximately equal to the output driver supply voltage $V_{IO}$ by a predetermined voltage. If the predetermined voltage is approximately one volt, the relationship set forth above by Equation 3 can be reduced to provide the relationship of Equation 4:

$$V_{MAX} < V_{IO} \qquad \text{Equation 4}$$

Figure 7B:
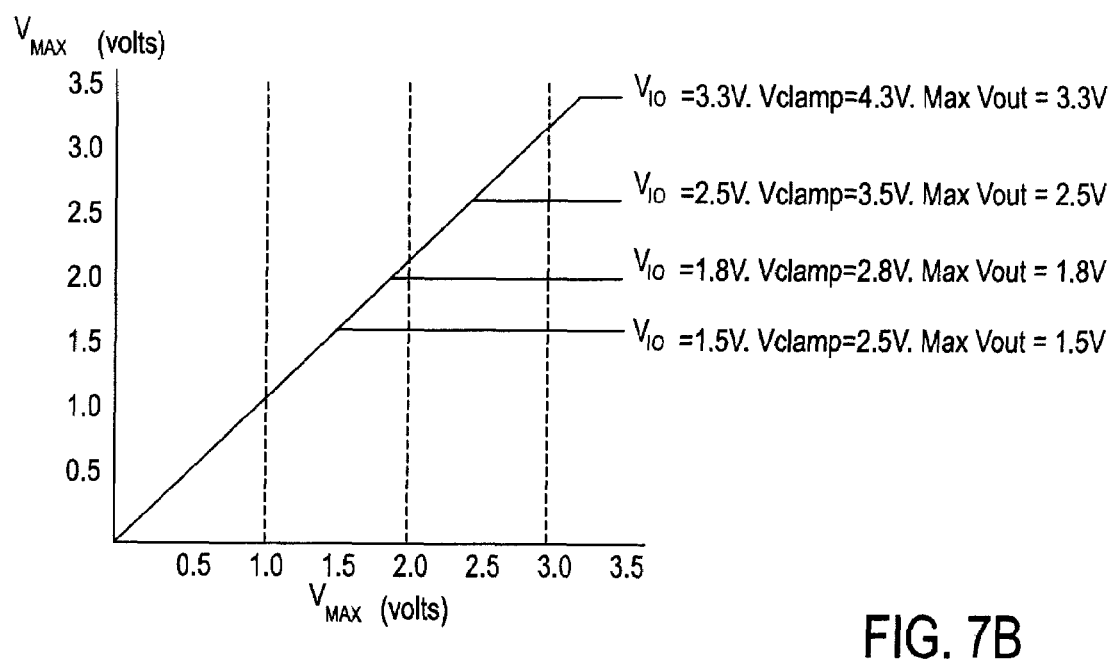
FIG. 7B is an exemplary graph illustrating the operation of the input protection system of FIG. 7A for a plurality of output driver supply voltages.

The selected field effect transistor 852 therefore conducts when the voltage level of the target data signals 540 is less than the output driver supply voltage $V_{IO}$. If the voltage level of the target data signals 540 is less than the output driver supply voltage $V_{IO}$, the impedance between the drain terminal D and the source terminal S of the field effect transistor 852 increases rapidly, thereby protecting the field-programmable gate array 650. FIG. 7B graphically illustrates the relationship between the voltage level $V_{MAX}$ of the relevant target data signals 540 and the voltage level $V_{MAX}'$ of the modified target data signals 540' that reach the field-programmable gate arrays 650 for selected output driver supply voltages $V_{IO}$.

Figure 8:
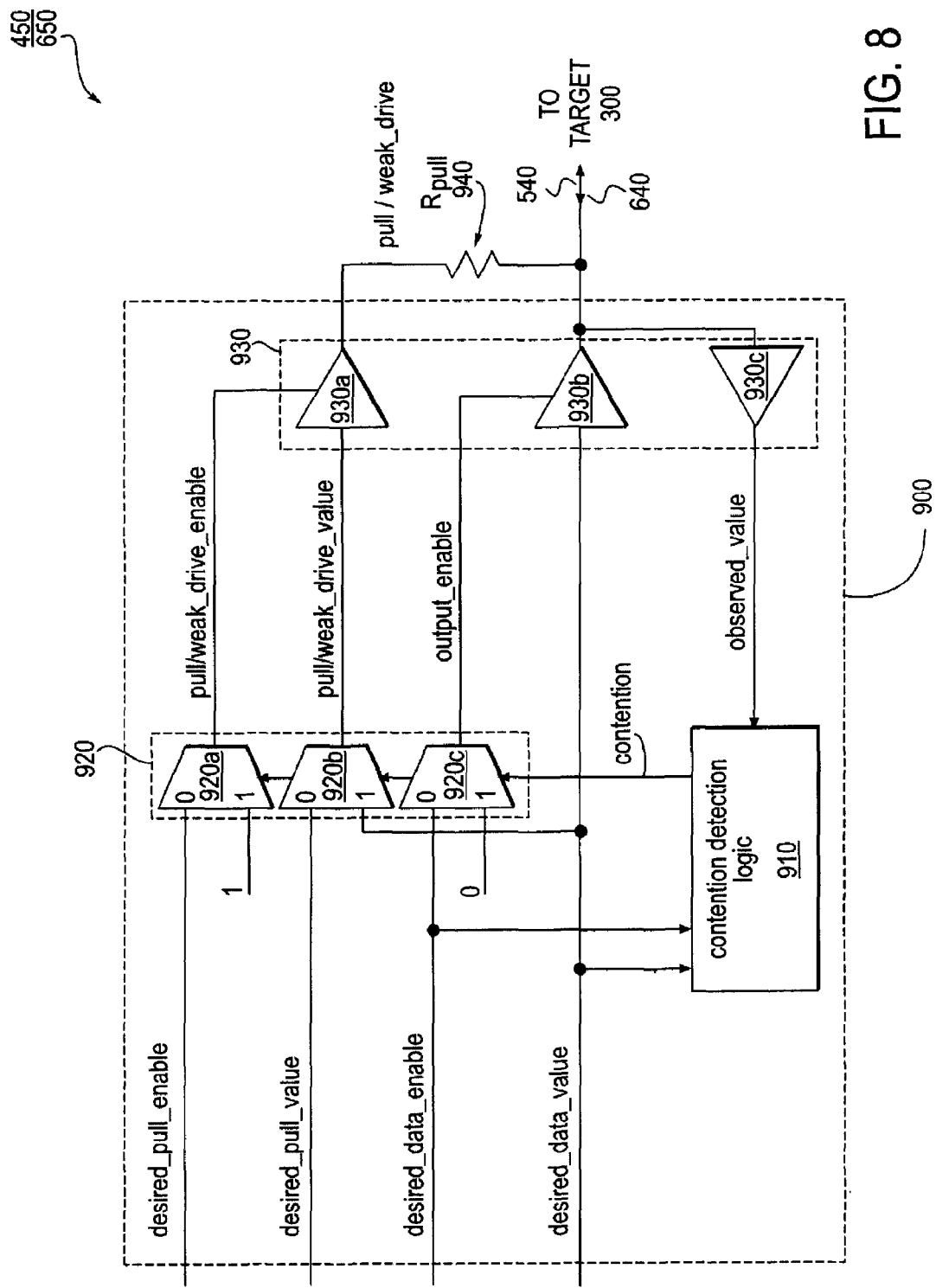
FIG. 8 is an exemplary block diagram illustrating an embodiment of a contention detection system for the target interface system of FIG. 3.

Turning to FIG. 8, the target interface system 450 can include a contention detection system 900 for detecting and/or resolving contention conditions in which the target interface system 450 and the target system 300 attempt to drive opposite signal values onto the same target I/O connection 640. By rapidly resolving contention conditions, the contention detection system 900 can inhibit any resultant damage to the target interface system 450 and/or the target system 300. The contention detection system 900 can be provided in any conventional manner and, as illustrated in FIG. 8, can be provided via the field-programmable gate array 650. Shown as providing contention detection for one signal pin of the field-programmable gate array 650, the contention detection system 900 of FIG. 8 preferably is replicated for each relevant signal pin of the field-programmable gate array 650. The relevant signal pin of the field-programmable gate array 650 include the signal pins that are configured to provide the target data signals 540 to the target system 300 and/or receive the target data signals 540 from the target system 300.

In a normal operation mode, the target interface system 450 preferably supports tristate and bidirectional target data signals 540 with the target system 300. To support tristate and bidirectional target data signals 540 between the target interface system 450 and the target system 300, each signal pin of the field-programmable gate array 650 can include a biasing circuit 940 for biasing the signal pin to a predetermined voltage level. As shown in FIG. 8, the biasing circuit 940 can include one or more resistive elements $R_{PULL}$ that can be configured as pull-up resistive elements and/or pull-down resistive elements in the conventional manner. The biasing circuit 940 is illustrated as being statically configured by a DESIRED_PULL_VALUE signal and a DESIRED_PULL_ENABLE signal that are provided to the biasing circuit 940 via multiplexers 920a, 920b and driver 930a of the field-programmable gate array 650. Thereby, the biasing circuit 940 can help ensure that the signal pin maintains a stable logic value if the signal pin is not driven by either the target interface system 450 or the target system 300.

When attempting to drive a selected target I/O connection 640 with a DESIRED_DATA_VALUE signal, the target interface system 450 can provide a DESIRED_DATA_ENABLE signal with a high logic state to multiplexer 920c of the field-programmable gate array 650 as shown in FIG. 8. The target interface system 450 likewise can observe the current signal state of the selected target I/O connection 640 via an OBSERVED_VALUE signal. The DESIRED_DATA_VALUE signal and the OBSERVED_VALUE signal each can be provided to contention detection logic 910. As illustrated in FIG. 8, the OBSERVED_VALUE signal is provided to the contention detection logic 910 via a driver 930c of the field-programmable gate array 650. The contention detection logic 910 can compare the DESIRED_DATA_VALUE signal and the OBSERVED_VALUE signal in the conventional manner. If the DESIRED_DATA_VALUE signal and the OBSERVED_VALUE signal are consistent, the contention detection logic 910 can enable the driver 930b to permit the target interface system 450 to drive the selected target I/O connection 640 with the DESIRED_DATA_VALUE signal.

If the contention detection logic 910 determines that the DESIRED_DATA_VALUE signal and the OBSERVED_VALUE signal are not consistent, however, the DESIRED_DATA_VALUE signal that the target interface system 450 is attempting to drive on the selected target I/O connection 640 does not match the actual OBSERVED_VALUE signal on the selected target I/O connection 640. The contention detection logic 910 preferably continues to compare the DESIRED_DATA_VALUE signal and the OBSERVED_VALUE signal for a predetermined time interval to determine whether the inconsistency between the DESIRED_DATA_VALUE signal and the OBSERVED_VALUE signal persists. If the inconsistency is resolved during the predetermined time interval, the contention detection logic 910 can permit the target interface system 450 to drive the selected target I/O connection 640 with the DESIRED_DATA_VALUE signal in the manner discussed above. Otherwise, the contention detection logic 910 asserts a CONTENTION signal to the multiplexer 920c such that the multiplexer 920c generates an OUTPUT-ENABLE signal with a low logic state to disable the driver 930b. The contention detection logic 910 thereby inhibits the target interface system 450 from driving the selected target I/O connection 640 with the inconsistent DESIRED_DATA_VALUE signal.

To detect the end of the contention between the DESIRED_DATA_VALUE signal and the OBSERVED_VALUE signal, the target interface system 450 preferably ensures that the selected target I/O connection 640 will assume the proper signal state when the target system 300 stops driving the contending target data signal 540. The target interface system 450 can ensure the proper signal state for the selected target I/O connection 640, for example, by weakly driving the DESIRED_DATA_VALUE signal onto the selected target I/O connection 640. During the predetermined time interval, the target interface system 450 can continue to weakly drive the DESIRED_DATA_VALUE signal until the contention detection logic 910 determines that the DESIRED_DATA_VALUE signal and the OBSERVED_VALUE signal are consistent. The target interface system 450 can weakly drive the DESIRED_DATA_VALUE signal onto the selected target I/O connection 640 in any conventional manner.

As shown in FIG. 8, the weak drive can be accomplished by providing the DESIRED_DATA_VALUE signal to the biasing circuit 940 by enabling driver 930a of the field-programmable gate array 650. The target interface system 450 thereby can drive the DESIRED_DATA_VALUE signal onto the selected target I/O connection 640 via the resistive element $R_{PULL}$. If the target interface system 450 detects contention between the DESIRED_DATA_VALUE signal and the OBSERVED_VALUE signal, the conflicting drivers are coupled by the resistive element $R_{PULL}$. The resistive element $R_{PULL}$ therefore can limit the current flowing between the conflicting drivers to a safe current level.

When the OBSERVED_VALUE signal for the selected target I/O connection 640 matches the DESIRED_DATA_VALUE signal, no contention exists, and the target interface system 450 can drive the selected target I/O connection 640 with the DESIRED_DATA_VALUE signal. The contention detection logic 910 likewise can reset the contention state and/or deassert the CONTENTION signal for the selected target I/O connection 640, and the target interface system 450 can resume the normal operation mode. Similarly, when the target interface system 450 attempts to drive the selected target I/O connection 640 with a new DESIRED_DATA_VALUE signal, the contention state for the selected target I/O connection 640 can be reset, and/or the CONTENTION signal for the selected target I/O connection 640 can be deasserted. The target interface system 450 thereafter can resume the normal operation mode in the manner set forth above.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the invention is to cover all modifications, equivalents, and alternatives falling within the spirit and scope of the claims.

What is claimed is:

1. A target interface system having a plurality of input/output connections for interfacing with a target system, comprising:
    a library of images that provides information associated with a plurality of input/output technologies;
    a reconfigurable logic device that downloads an image associated with a selected input/output technology from said library prior to runtime;
    an input protection system that receives a clamp control signal from said reconfigurable logic device and for setting a voltage limit for input/output signals received from the target system, said voltage limit being selectable based upon said clamp control signal and being appropriate for said selected input/output technology;
    a source voltage generator that receives a voltage select signal from said reconfigurable logic device and provides an output driver supply voltage, said output driver supply voltage being selectable based upon said voltage select signal and being appropriate for said selected input/output technology; and
    a control system that monitors said output driver supply voltage and disables the plurality of input/output connections if said output driver supply voltage is outside a predetermined supply voltage range.

2. The target interface system of claim 1, wherein said reconfigurable logic device comprises at least one field-programmable gate array.

3. The target interface system of claim 1, wherein said input protection system includes a clamp voltage generator that receives said output driver supply voltage and provides a clamp voltage greater than said output driver supply voltage by a predetermined voltage, said clamp voltage being suitable for setting said voltage limit.

4. The target interface system of claim 3, wherein said control system monitors said clamp voltage and disables the plurality of input/output connections if said clamp voltage is outside a predetermined clamp voltage range.

5. The target interface system of claim 3, wherein said predetermined voltage is equal to one volt.

6. The target interface system of claim 1, further comprising a reference voltage generator that receives said output driver supply voltage and reference control signal and provides a reference voltage proportional to said output driver supply voltage, said reference voltage being selectable based upon said reference control signal and being appropriate for said selected input/output technology.

7. The target interface system of claim 6, wherein said control system monitors said reference voltage and disables the plurality of input/output connections if said reference voltage is outside a predetermined reference voltage range.

8. The target interface system of claim 1, wherein said control system includes at least one terminal for monitoring a target system voltage provided by the target system, said control system disabling the plurality of input/output connections if said target system voltage is outside a predetermined target system voltage range.

9. The target interface system of claim 8, further comprising a biasing system that detects the absence of the target system, said biasing system biasing at least one of said at least one terminal to a predetermined bias voltage level distinguishable from said target system voltage.

10. The target interface system of claim 9, wherein said biasing system detects overvoltage conditions and undervoltage conditions for the target system voltage.

11. The target interface system of claim 1, further comprising a contention detection system that detects contention conditions on the plurality of input/output connections.

12. A communication system for exchanging communication signals, comprising:
a first system; and
an interface system that interfaces said first system and a second system, comprising:
a plurality of input/output connections that interface the second system;
a library of images, each of said images containing information associated with a plurality of input/output technologies;
a reconfigurable logic device that downloads an image associated with a selected input/output technology from said library prior to runtime;
an input protection system that receives a clamp control signal from said reconfigurable logic device and sets a voltage limit for input/output signals received from the second system, said voltage limit being selectable based upon said clamp control signal and being appropriate for said selected input/output technology;
a source voltage generator that receives a voltage select signal from said reconfigurable logic device and provides an output driver supply voltage, said output driver supply voltage being selectable based upon said voltage select signal and being appropriate for said selected input/output technology; and
a control system that monitors said output driver supply voltage and disables said plurality of input/output connections if said output driver supply voltage is outside a predetermined supply voltage range.

13. The communication system of claim 12, wherein said first system comprises a hardware emulation system.

14. The communication system of claim 12, wherein said reconfigurable logic device comprises at least one field-programmable gate array.

15. The communication system of claim 12, wherein said input protection system includes a clamp voltage generator that receives said output driver supply voltage and provides a clamp voltage greater than said output driver supply voltage by a predetermined voltage, said clamp voltage being suitable for setting said voltage limit.

16. The communication system of claim 12, further comprising a reference voltage generator that receives said output driver supply voltage and reference control signal and provides a reference voltage proportional to said output driver supply voltage, said reference voltage being selectable based upon said reference control signal and being appropriate for said selected input/output technology.

17. The communication system of claim 12, wherein said control system includes at least one terminal for monitoring a second system voltage provided by the second system, said control system disabling said plurality of input/output connections if said second system voltage is outside a predetermined second system voltage range.

18. The communication system of claim 12, wherein said control system includes at least one terminal that monitors a second system voltage provided by the second system, said control system disabling said plurality of input/output connections if said second system voltage is outside a predetermined target system voltage range.

19. The communication system of claim 12, further comprising a contention detection system that detects contention conditions on said plurality of input/output connections.

20. A method for interfacing with a target system, comprising:
providing a plurality of input/output connections for interfacing with the target system;
providing a library of images having information associated with a plurality of input/output technologies;
downloading an image associated with a selected input/output technology from said library to a reconfigurable logic device prior to runtime;
setting a voltage limit for input/output signals received from the target system, said voltage limit being selectable based upon said clamp control signal provided by said reconfigurable logic device and being appropriate for said selected input/output technology;
providing an output driver supply voltage selectable based upon said voltage select signal provided by said reconfigurable logic device and being appropriate for said selected input/output technology;
monitoring said output driver supply voltage; and
disabling said plurality of input/output connections if said output driver supply voltage is outside a predetermined supply voltage range.

21. The method of claim 20, wherein said setting a voltage limit includes providing a clamp voltage greater than said output driver supply voltage by a predetermined voltage, said clamp voltage being suitable for setting said voltage limit.

22. The method of claim 21, further comprising monitoring said clamp voltage and disabling said plurality of input/output connections if said clamp voltage is outside a predetermined clamp voltage range.

23. The method of claim 20, further comprising providing a reference voltage proportional to said output driver supply voltage, said reference voltage being selectable based upon said reference control signal provided by said reconfigurable logic device and being appropriate for said selected input/output technology.

24. The method of claim 23, further comprising monitoring said reference voltage and disabling said plurality of input/output connections if said reference voltage is outside a predetermined reference voltage range.

25. The method of claim 20, further comprising monitoring a target system voltage provided by the target system, said control system disabling said plurality of input/output connections if said target system voltage is outside a predetermined target system voltage range.

26. The method of claim 25, further comprising detecting the absence of the target system by biasing at least one terminal for receiving said target system voltage to a predetermined bias voltage level distinguishable from said target system voltage.

27. The method of claim 26, further comprising detecting overvoltage conditions and undervoltage conditions for the target system voltage.

28. The method of claim 20, further comprising detecting contention conditions on said plurality of input/output connections.

* * * * *